(12) United States Patent
Richter et al.

(10) Patent No.: US 11,498,153 B2
(45) Date of Patent: Nov. 15, 2022

(54) HEAD PIECE, WELDING TOOL, AND WELDING METHOD (71) Applicant: KUKA Deutschland GmbH, Augsburg (DE)

(72) Inventors: Bernd Richter, Königsbrunn (DE); Stefan Fröhlke, Augsburg (DE); Junhua Gao, Augsburg (DE); Stefan Habersetzer, Rinnenthal (DE)

(73) Assignee: KUKA Deutschland GmbH, Augsburg (DE)

( * ) Notice: Subject to any disclaimer, the term of this patent is extended or adjusted under 35 U.S.C. 154(b) by 35 days.

(21) Appl. No.: 15/734,394

(22) PCT Filed: Jun. 7, 2019

(86) PCT No.: PCT/EP2019/064924
§ 371 (c)(1),
(2) Date: Dec. 2, 2020

(87) PCT Pub. No.: WO2019/234212
PCT Pub. Date: Dec. 12, 2019

(65) Prior Publication Data
US 2021/0170520 A1    Jun. 10, 2021

(30) Foreign Application Priority Data
Jun. 8, 2018 (DE) .................... 10 2018 113 680.3

(51) Int. Cl.
B23K 20/12    (2006.01)
(52) U.S. Cl.
CPC ...... *B23K 20/1225* (2013.01); *B23K 20/1265* (2013.01)

(58) Field of Classification Search
CPC .............................................. B23K 20/22–128
See application file for complete search history.

(56) References Cited

U.S. PATENT DOCUMENTS 7,455,212 B2 * 11/2008 Mika .................. B23K 20/1245
228/2.1
8,857,696 B1 * 10/2014 Merah ................ B23K 20/1255
228/2.1

(Continued)

FOREIGN PATENT DOCUMENTS

CN    105598575 A    5/2016
DE    102012010836 B3    6/2013

(Continued)

OTHER PUBLICATIONS

European Patent Office; Search Report in related International Patent Application No. PCT/EP2019/064924 dated Aug. 23, 2019; 3 pages.

(Continued)

*Primary Examiner* — Erin B Saad
*Assistant Examiner* — Carlos J Gamino
(74) *Attorney, Agent, or Firm* — Dorton & Willis, LLP (57) ABSTRACT A head piece and a welding tool, in particular an FSW tool, equipped therewith, and a welding method. The head piece has a through-opening for a plasticizing welding means, in particular a rotating welding pin. The head piece also has a profiled end face which faces the workpiece during welding and has end face regions of different heights and a sloping shoulder, which conducts the plasticized material of the workpiece and connects the end face regions.

16 Claims, 5 Drawing Sheets

(56) References Cited

U.S. PATENT DOCUMENTS

| | | | |
|---|---|---|---|
| 11,065,714 B2 * | 7/2021 | Weigl | B23K 20/123 |
| 2004/0074949 A1 * | 4/2004 | Narita | B23K 20/122 |
| | | | 228/112.1 |
| 2012/0193401 A1 * | 8/2012 | Hori | B23K 20/1265 |
| | | | 228/2.1 |
| 2014/0203067 A1 * | 7/2014 | Silvanus | B23K 20/122 |
| | | | 228/2.1 |
| 2014/0360650 A1 * | 12/2014 | Silvanus | B23K 20/1255 |
| | | | 228/2.1 |
| 2015/0102087 A1 * | 4/2015 | Foerg | B23K 20/123 |
| | | | 228/2.1 |
| 2016/0263696 A1 * | 9/2016 | Nishida | B23K 20/16 |
| 2017/0080527 A1 | 3/2017 | Weigl | |
| 2019/0091797 A1 | 3/2019 | Weigl | |

FOREIGN PATENT DOCUMENTS

| | | |
|---|---|---|
| DE | 102014004331 B3 | 6/2015 |
| DE | 102016003580 B3 | 8/2017 |
| JP | 3290608 B2 | 6/2002 |
| JP | 2016123984 A | 7/2016 |

OTHER PUBLICATIONS

German Patent Office; Search Report in related German Patent Application No. 10 2018 113 680.3 dated Jan. 23, 2019; 5 pages.

* cited by examiner

HEAD PIECE, WELDING TOOL, AND WELDING METHOD

CROSS-REFERENCE TO RELATED APPLICATIONS

This application is a national phase application under 35 U.S.C. § 371 of International Patent Application No. PCT/EP2019/064924, filed Jun. 7, 2019 (pending), which claims the benefit of priority to German Patent Application No. DE 10 2018 113 680.3, filed Jun. 8, 2018, the disclosures of which are incorporated by reference herein in their entirety.

TECHNICAL FIELD

The invention relates to a head piece, a welding tool, in particular an FSW tool, and a welding method, in particular an FSW method.

BACKGROUND

An FSW tool and an FSW method used for friction stir welding are known from practice. Friction stir welding is also referred to in short as "FSW". In the following, the abbreviation FSW is used for friction stir welding.

SUMMARY

It is the object of the present disclosure to provide an improved welding technology, in particular FSW technology.

The welding technology disclosed herein in particular the FSW technology, i.e., the head piece, the welding tool and the welding method as well as the welding part produced with it, have various advantages. With this welding technology, workpieces with a height difference at the weld joint, for example workpieces lying on top of one another with a lap joint or workpieces of different thicknesses with a butt joint, can be welded, in particular FSW-welded, better and more reliably than before.

The quality and strength of the weld joint can be improved. In addition, gaps between the workpieces can be tightly closed with an inclined welding transition region, for example. This is particularly advantageous in the case of a lap joint with the workpieces lying on top of one another. The tight gap seal prevents crevice corrosion or other corrosive and otherwise unfavorable environmental influences. The ability to weld workpieces together that lie on top of one another in the lap joint close to their workpiece edge is also particularly favorable. The weld transition region is also favorable for the strength of the weld part in such an edge area and for an advantageous structure formation. Such an inclined transition region is also advantageous for mechanical stress reasons.

One embodiment in accordance with the disclosure provides for a head piece for a welding tool, in particular an FSW tool, with a through-opening for a plasticizing welding means, in particular a rotating welding pin, with the head piece having a profiled end face with differently high end face regions that face the workpiece during welding operation. The end face regions protrude differently far from the end face or end surface.

A sloping shoulder connects these end face regions of different heights and can guide the workpiece material plasticized by the welding means during the welding process. The sloping shoulder also compensates for the difference in height of the end face regions. The shoulder is preferably aligned transversely to a welding feed direction and has a sloped alignment or inclination in accordance with said height difference. There are different options for the design and arrangement of the sloping shoulder.

In one embodiment, the sloping shoulder is arranged on said end face in the region of the through-opening of the head piece and the exit point of the through-opening there. The sloping shoulder can be arranged in the rear region of the through-opening, in particular seen in the welding feed direction. In one embodiment, the sloping shoulder can have an essentially straight extension and possibly a rear-side distance from the through-opening.

In a particularly favorable embodiment, the sloping shoulder is arcuate and, viewed in the welding feed direction, surrounds the rear region of the through-opening in a semi-annular or semi-circular shape. The sloping shoulder can connect directly to the edge of the through-opening. The opening edge can also be the shoulder edge.

The sloping shoulder can have a shoulder surface, in particular an arcuate surface, which has an elevation. The shoulder surface or arch surface can slope backward toward the rear starting from its front edge facing the through-opening. As a result of the elevation, the front shoulder edge can form a type of clearing edge for influencing and guiding the plasticized material during the relative movement between the head piece of the welding tool and the workpieces to be welded.

In a further embodiment, the end face regions of the head piece having different heights can extend in the welding feed direction starting from the through-opening. These regions can also have a flat surface. In one embodiment, the profiled end face has two end face regions with different heights. The number of end face regions can also be greater than two. The mentioned difference in height of the end face regions relates to the normal direction on the main plane of the end face of the head piece. This direction can coincide with the axis of the through-opening at the exit point at the end face. The head piece can rest on or be closely adjacent to the workpieces with the end face regions of different heights. This is particularly favorable if the workpieces have different heights at the weld joint.

A straight step can be formed between the end face regions of different heights. This can start approximately at the center from the front edge of the through-opening and extend in the welding feed direction. The straight step can form a leading edge for the movement of the welding tool and its head piece during the welding feed. This facilitates and improves the exact guidance of the welding tool during the welding process and improves the welding quality. During the welding feed, the welding tool can be aligned perpendicular to the workpiece surface. Alternatively, it can also be oriented obliquely in the feed direction with the tip of the welding means leading, for example.

The difference in height between the end face regions or the height of the straight step can be adapted to a difference in height between the workpieces to be welded. The workpieces can lie on top of one another and be welded with a lap joint. On the other hand, workpieces of different thicknesses can be butt jointed and welded in one butt joint. The adjustment can consist of an alignment or an approximation of the height differences.

The claimed head piece is a technically and economically independent unit. The head piece can be arranged in the welding tool in a fixed or detachable manner. The head piece can be present when the welding tool is originally fitted. If necessary, the head piece can also be retrofitted or converted on a welding tool, for example exchanged for another existing head piece.

The exemplary welding tool, in particular an FSW tool, comprises a plasticizing welding means, in particular a rotating welding pin, and the claimed head piece comprises a through-opening for the welding means. Deviating from the preferred embodiment as an FSW tool, the welding tool can also be designed differently and have a different plasticizing welding means. This means can be, for example, a high-energy beam directed through the through-opening, an erosion pen or the like. The head piece can also be used successfully for such other types of welding tools.

In one technical embodiment, the head piece is arranged on the welding tool in a rotationally fixed manner. In the case of an FSW welding tool, the welding pin rotates in the head piece and can optionally also be arranged to be axially movable.

The welding tool can likewise have further required components, for example a drive for a rotating welding pin or another plasticizing welding means, a holder for the plasticizing welding means, in particular the rotating welding pin, or a connection for a handling device.

The handling device can preferably be a multi-axis and, in particular, a tactile industrial robot. Such an industrial robot preferably has four, five or more controllably driven robot axes. The tactile industrial robot can have an assigned sensor system for absorbing external loads. This can be a sensor system arranged between the welding tool and the output element of the handling device, in particular of the industrial robot. In one advantageous embodiment, the tactile industrial robot has an integrated sensor system. This sensor system can have load-absorbing sensors on the robot axes. These sensors can, in particular, be force sensors or torque sensors. In addition, position sensors or other sensors can be arranged on the robot axes. A welding device consisting of the claimed welding tool and a handling device, in particular said multi-axis and tactile industrial robot, can also be the object of the invention.

The head piece can be arranged on the welding tool such that it can be exchanged. It can be designed as an adapter for different workpieces having a changing height difference that are to be welded. The head piece can be detachably attached to the welding tool in a suitable manner, for example by a screw or bayonet connection. A connection technique that enables an exact rotational alignment of the head piece with respect to the welding feed direction that is intended and possibly programmed is advantageous. The welding tool can be equipped with a kit of different head pieces or adapters. The welding tool can thus be adapted quickly and easily to different workpieces and process conditions.

The invention also relates to a welded part made from workpieces that were welded with the claimed welding method, in particular the FSW method. This has the said advantage that a gap originally present between the workpieces to be welded can be tightly closed by a welding transition region at the weld seam. The welding transition region can have a preferably sloped design. As a result, the jump point or step between the workpieces lying on top of one another in the lap joint or the workpieces butted together in the butt joint can be filled by the weld seam.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

The invention relates to a head piece (3) for a welding tool (1), in particular an FSW tool. The invention also relates to this welding tool (1), in particular an FSW tool and an associated welding method, in particular an FSW method. The invention also relates to a welded part produced with said method.

FIG. 1 to FIG. 9 illustrate an exemplary head piece (3) in different views. The head piece (3) can be a detachable component of a welding tool (1), in particular an FSW tool. The welding tool (1) is only indicated schematically in the drawings.

In addition to the head piece (3), the welding tool (1) comprises a welding means (2) plasticizing the workpiece (7, 8) as well as other components. In the embodiment shown for the friction stir welding, the welding means (2) is a schematically illustrated rotating welding pin, which is rotatably and optionally also adjustably positioned in a suitable holder (not shown) in the axial direction. Said further components can be a rotary drive and possibly also a feed drive for the welding means (2), a control unit and the like.

The welding tool (1) can be moved and guided along a welding path by a handling device (not shown) in a welding feed direction (6) relative to two or more workpieces (7, 8) to be welded. The welding tool (1) can be moved relative to the stationary workpieces (7, 8). Alternatively, a kinematic reversal or a mutual relative movement is possible. The handling device can, for example, be the aforementioned multi-axis and preferably tactile industrial robot. The welding tool (1) can have a suitable connection for attachment to the handling device and, if necessary, also for a required supply of operating resources.

Figure 1:
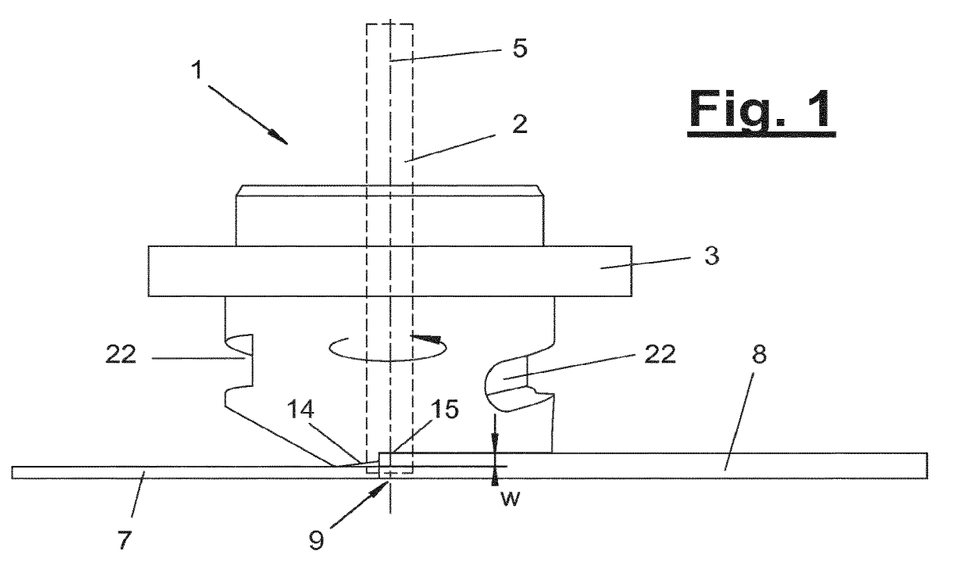
FIG. 1 and FIG. 2 depict an exemplary head piece for a welding tool in different side views.
Figure 2:
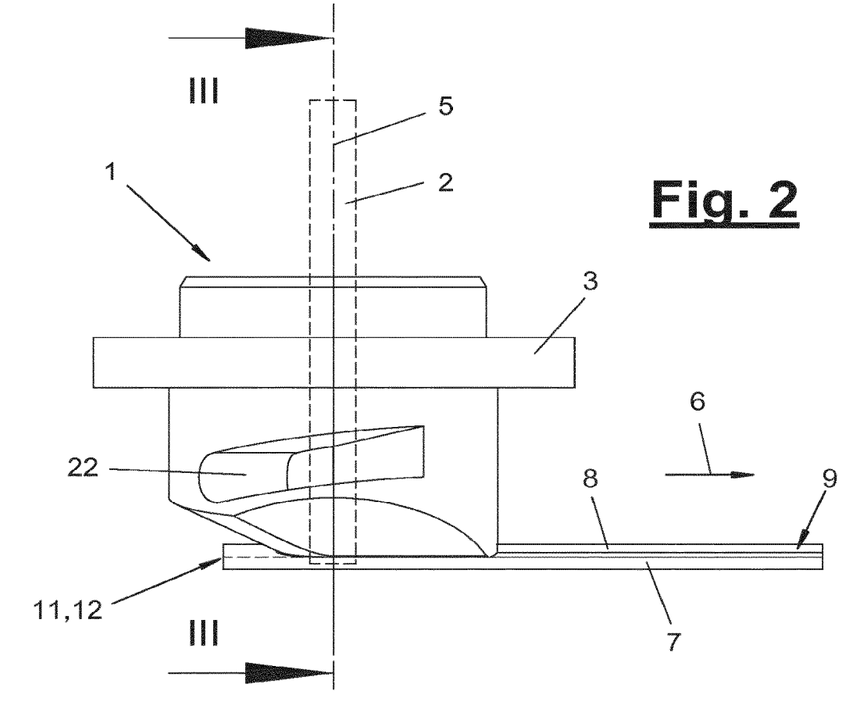
Figure 3:
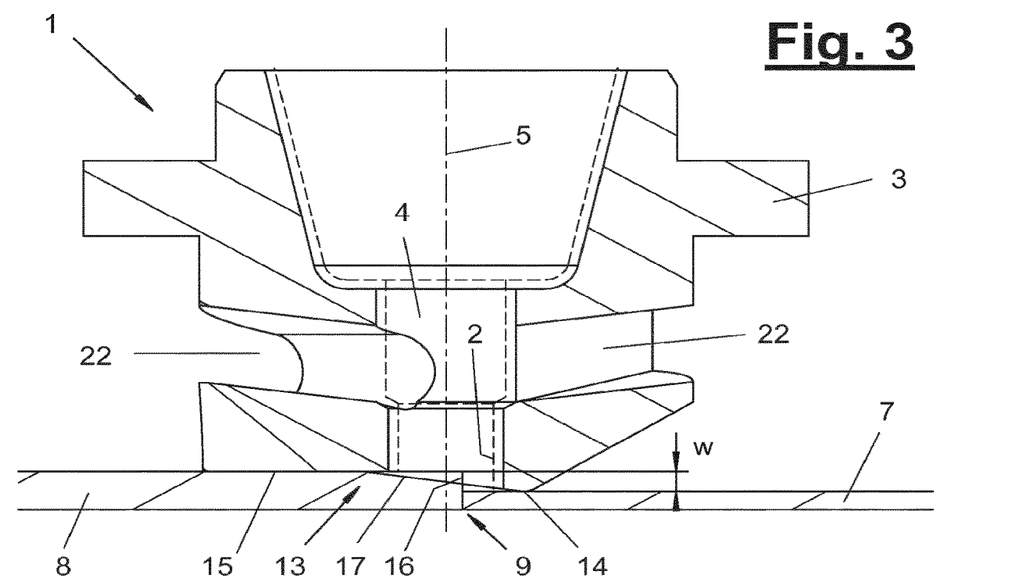
FIG. 3 depicts a section through the head piece according to section line III-III of FIG. 2.
Figure 10:
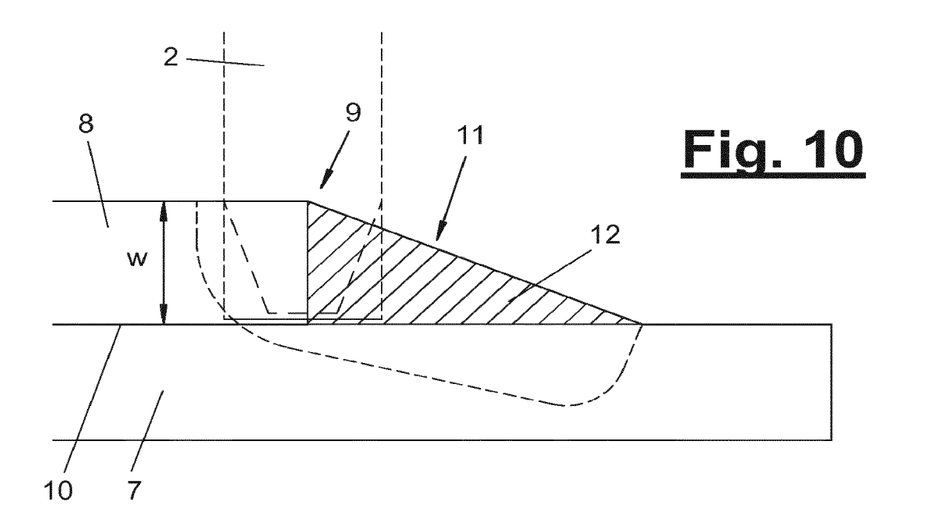
FIG. 10 illustrates a welded lap joint between workpieces lying on top of one another with a sloped welding transition region.

The workpieces (7,8) can be designed as metal sheets, for example. In FIG. 10, for example, they form container flanges which are welded tightly and in such a way that they are corrosion-resistant, at least to the outside. FIG. 1 to FIG. 3 show tailor-welded blanks, for example.

The drawings show various welding arrangements of workpieces (7,8) and weld joints (9). FIG. 1 to FIG. 3 show a butt joint between the end faces of workpieces (7, 8) of different thicknesses. FIG. 10 shows a lap joint of two workpieces (7, 8) lying on top of one another. In both variants, there is a step between the thicker or upper workpiece (8) and the thinner or lower workpiece (7).

The welding means (2) is directed toward the butt joint or welding joint (9) of the workpieces (7,8). It acts on both workpieces (7,8) at their respective edge, for example according to FIG. 1 and FIG. 10. There can be an unequal tool overlap in this case, for example, with the overlap on the thicker or upper workpiece (8) being greater. The workpieces (7,8) can be made of the same or different materials, in particular metals. In the example shown, they are both made from a light metal alloy, for example aluminum alloy. Alternatively, differently melting or plasticizing material pairings, for example a light metal alloy and steel, are possible.

The head piece (3) shown in the drawings has a preferably central through-opening (4) for the welding means (2) and an end face (13) or end surface facing the workpiece (7,8) during welding operation. The through-opening (4) leads to the end face (13). The head piece (3) can, for example, have the hollow body shape shown in the sectional views of FIG. 3 and FIG. 4 and can be detachably connected to a component of the welding tool (1) by means of a screw connection, a plug or bayonet connection or in some other suitable manner. Alternatively, a permanent connection is possible.

In the drawings, the welding tool (1) and the head piece (3) are aligned perpendicular or in the normal direction to the main plane or surface of the workpieces (7,8) to be welded. Likewise, the through-opening (4) with its central axis (5) has this orientation as well. The axis (5) can also be the central axis of the head piece (3). The axis (5) is aligned perpendicular to the welding feed direction (6).

In a modification of the embodiment shown, the welding tool (1) and the head piece (3) can be positioned such that they are slightly tilted against the welding feed direction (6) and such that they have a so-called penetration angle of, for example, approximately 2° against said normal direction with respect to the workpieces (7,8). The tip of the welding means (2) acting on the workpieces (7,8) and on the weld joint (9) can lead in the welding feed direction (6).

The head piece (3) has a profiled end face (13) with end face regions (14,15) of different heights. The end face regions (14,15) protrude differently far from the end face (13) or its main plane. The end face regions (14,15) have a height difference (h) shown in FIG. 3 and FIG. 8. The height difference (h) can be aligned in the direction of the axis (5).

The head piece (3) has a sloping shoulder (17) which connects the end face regions (14, 15) of different heights. The shoulder (17) compensates for the difference in height and guides the workpiece material, which has been plasticized during the welding process. As a result, a welding transition region, shown in FIG. 10, can be formed between the weld seam (11) of the workpieces (7,8).

The welding means (2) acts on the thicker or upper workpiece (8) earlier and, if necessary, more strongly, its material being increasingly plasticized and displaced. Said step between the workpieces (7,8) is filled by the guided plasticized material and the welding transition region (12). The welding transition region (12) can have a sloped extension.

In another variant of a lap joint with workpieces (7,8) lying flush on top of one another, the welding transition region can be designed differently, for example in the manner of a cap.

A possibly existing gap (10) (cf. FIG. 10) between the workpieces (7,8) to be welded can be tightly closed by the welding transition region (12).

As FIG. 1 to FIG. 9 illustrate, the sloping shoulder (17) is arranged in the region of the through-opening (4). The shoulder is located at the rear of the through-opening (4) when viewed in the welding feed direction (6). In the exemplary embodiment shown, the sloping shoulder (17) is arcuate and surrounds the through-opening (4) in a semi-annular manner in its rear region or, in the case of a circular through-opening (4), in a semi-circular manner.

The sloping shoulder (17) in the embodiment shown has a surface or arcuate surface (18).

Its width can remain the same over the angle of the arc. The arcuate shoulder (17) directly adjoins the through-opening (4) on the rear side, seen in the welding feed direction (6), with the edge (19) of the shoulder (17) or its arcuate surface (18) also being the opening edge.

The arcuate surface (18) can have an elevation. Said elevation slopes backward from its front edge (19). The edge (19) is the part of the arcuate surface (18) which protrudes furthest in the direction of the axis (5).

In a modification that is not shown, the sloping shoulder (17) can, on the one hand, be located at a distance from the through-opening (4) that is counter to the welding feed direction (6). It can also have a different, for example straight, extension and can be oriented transversely to the welding feed direction (6). The shoulder can maintain its sloped inclined arrangement or position for guiding the plasticized material.

The end face regions (14,15) of different heights can start from the through-opening (4) and can extend in the welding feed direction (6). They preferably each have a flat surface. FIG. 4 to FIG. 7 show this design.

The higher end face region (14) is flush with the upper end of the shoulder (17) or arcuate surface (18) at the level of the axis (5). A set-off (20) can be provided at the lower connection point of the shoulder (17) or arcuate surface (18) and the lower end face region (14).

A straight step (16), for example, is formed between the end face regions (14,15) of different heights. According to FIG. 5 to FIG. 6, this step starts approximately centrally from the front edge of the through-opening (4) and extends in the welding feed direction (6).

Figure 4:
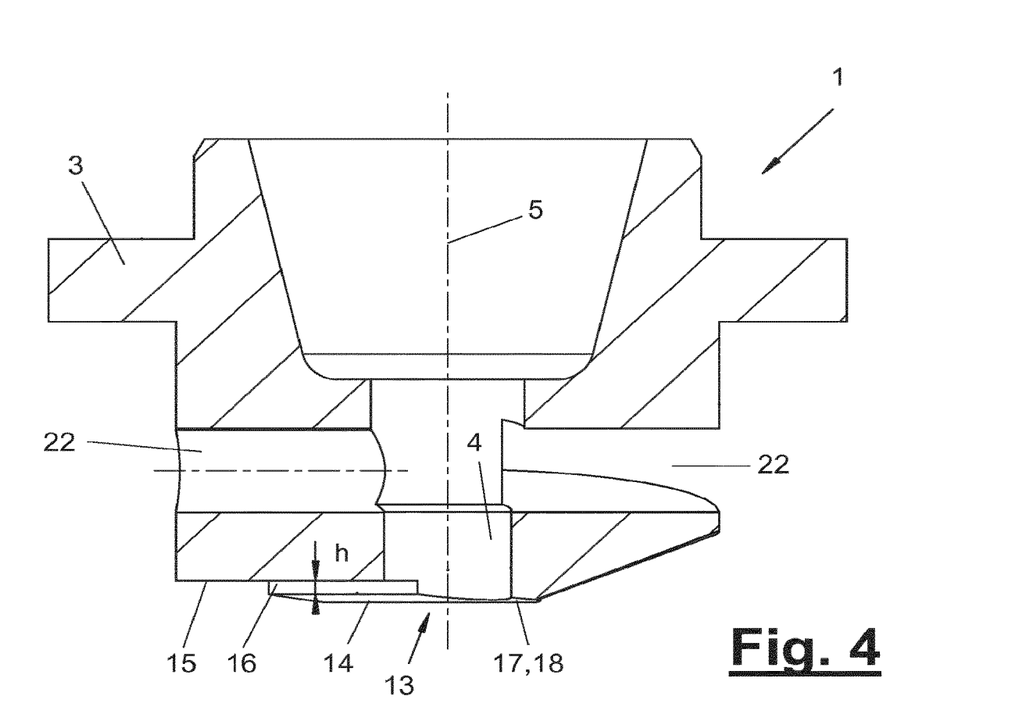
FIG. 4 depicts a different sectional view of the head piece.
Figure 5:
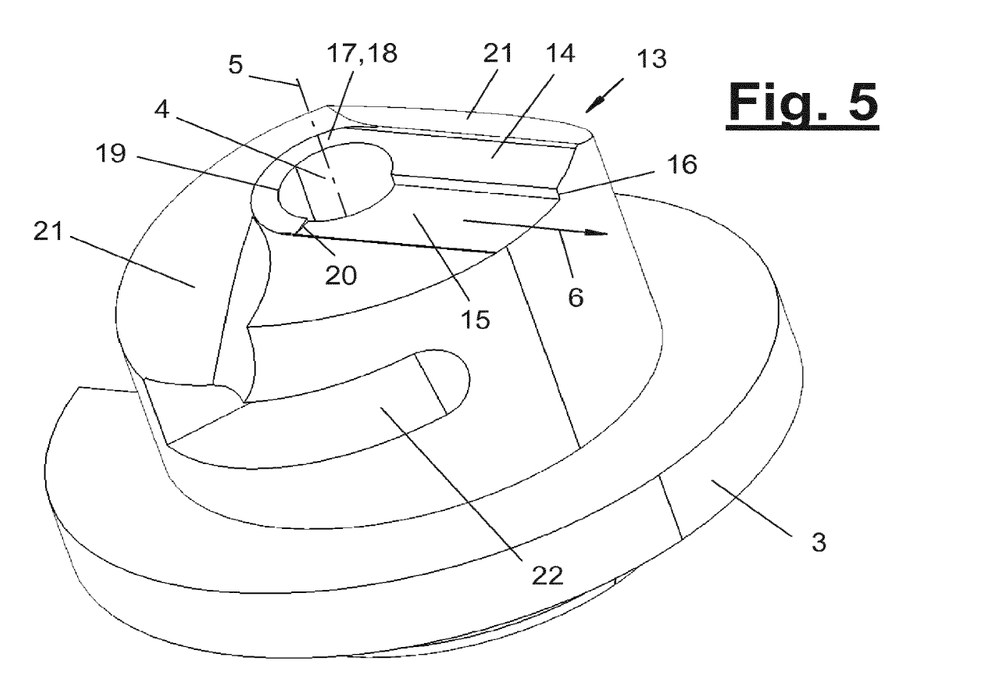
FIG. 5 and FIG. 6 depict various perspective views of the head piece and its end face.
Figure 6:
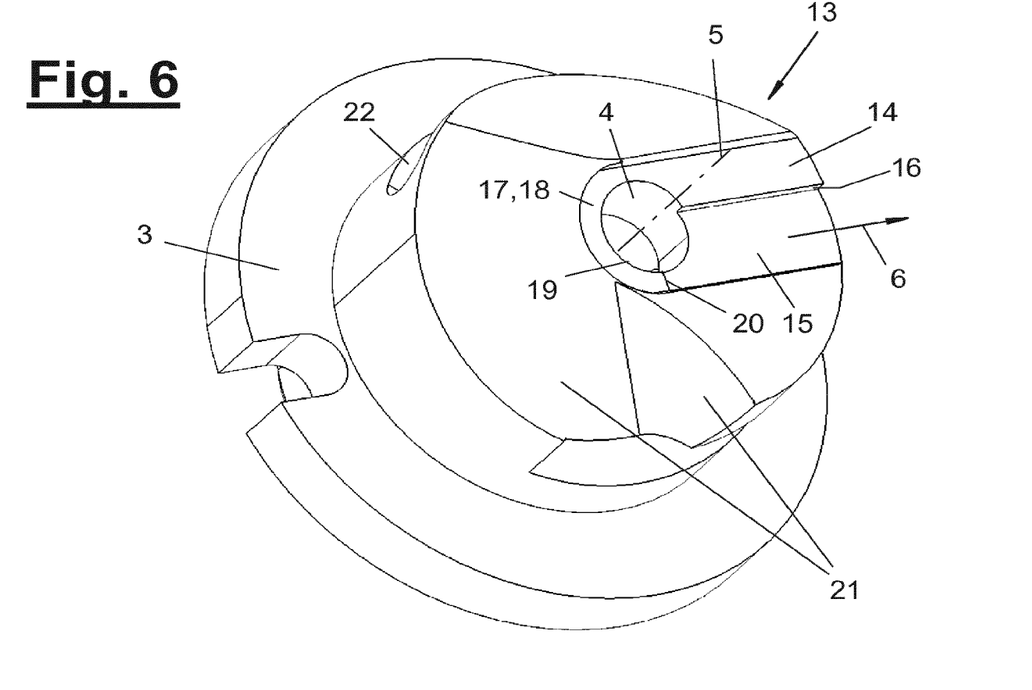
Figure 7:
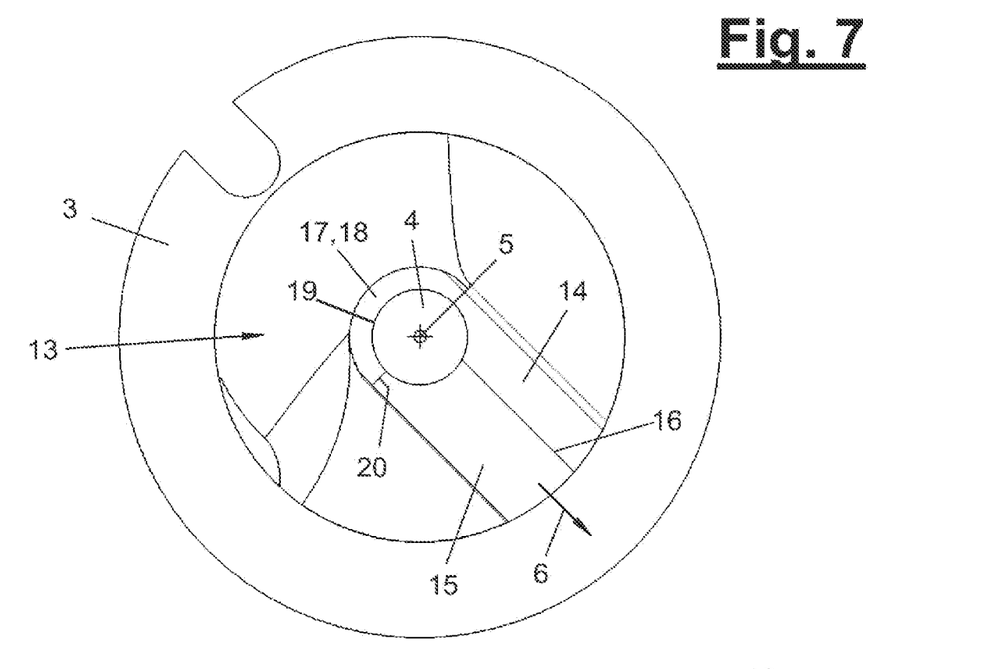
FIG. 7 and FIG. 8 depict a plan view and a side view of the head piece.
Figure 8:
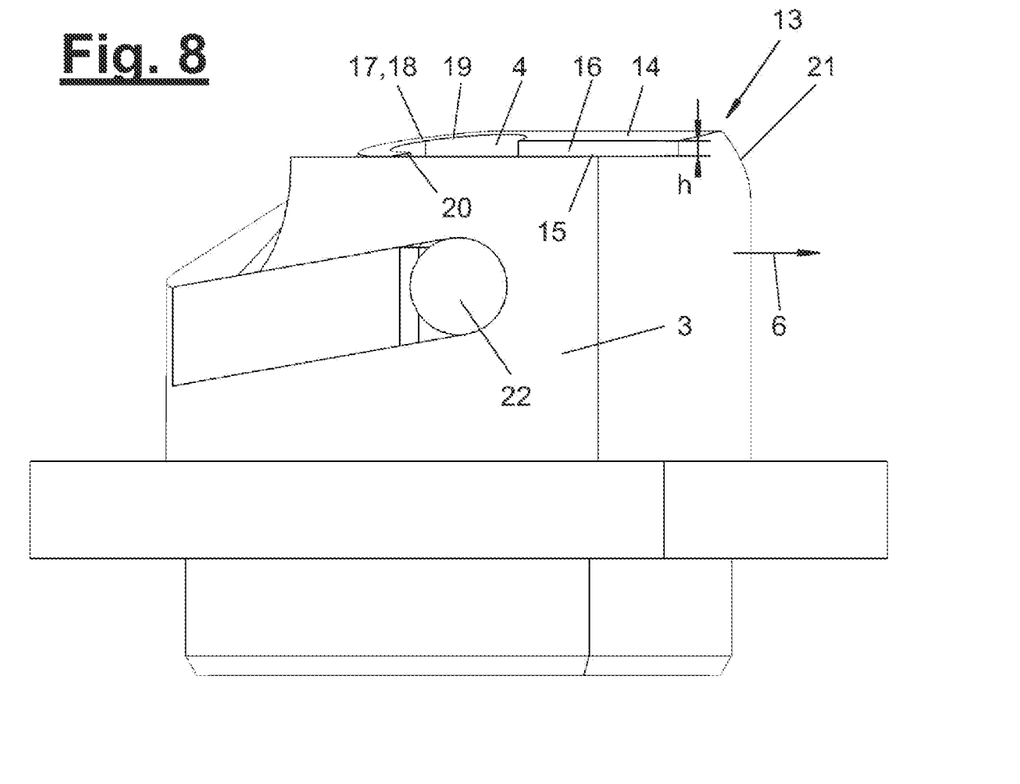
Figure 9:
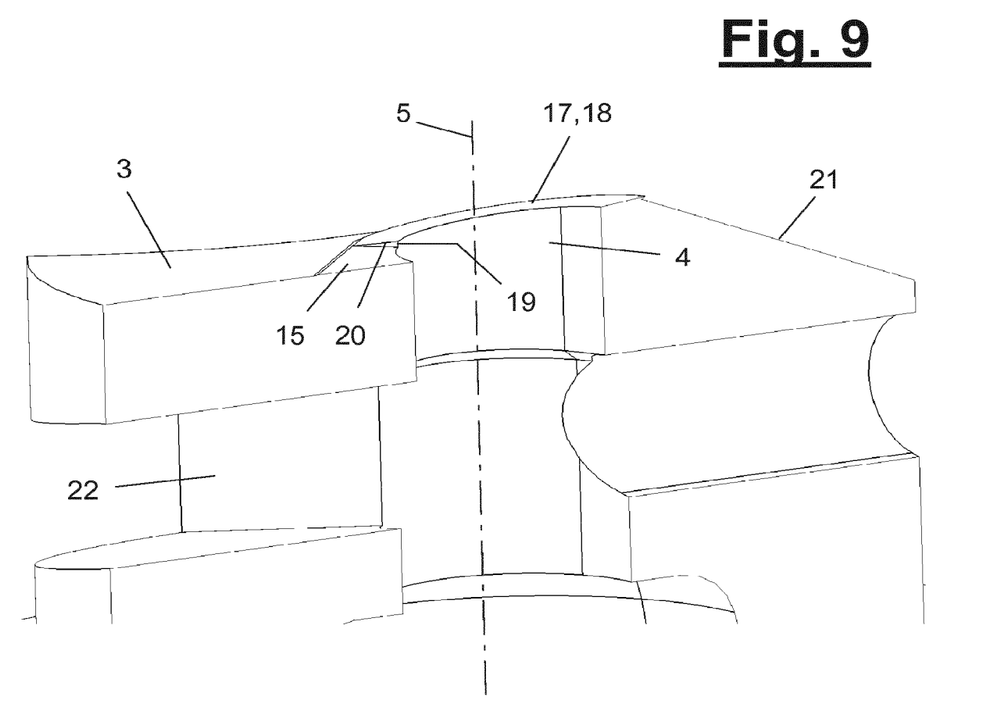
FIG. 9 depicts another and enlarged section through the upper head piece region on the end face.

According to FIG. 4, FIG. 5 and FIG. 9, the surfaces of the end face regions (14, 15) can be aligned obliquely to one another when viewed transversely to the feed direction (6). Each slope can, for example, slope down toward the step (16). It is also possible to align the surface of the lower end face region (15) at a right angle to the normal direction or to the axis (5) and to slope the surface of the higher face region (14) in the aforementioned manner. The surfaces can also be aligned parallel to one another.

The head piece (3) can have sloping cutouts (21) on the upper side. As a result, the end face regions (14,15) which primarily interact with the workpieces (7,8) and the sloping shoulder (17) can be exposed and constraints during the welding feed can be avoided. The head piece (3) can have a preferably cylindrical body on the front region facing the work pieces (7,8). The end face regions (14,15) end in the feed direction (6) at the edge of the body.

The height difference (h) of the end face regions (14,15) is formed on the step (16). The step wall extends, for example, perpendicular to the surfaces of the end face regions (14,15) and can run parallel to the axis (5).

The height difference (h) of the end face regions (14, 15) can be adapted to a height difference (w) on the workpieces (7,8) to be welded. According to FIG. 1 and FIG. 3, this height difference (w) can be present on workpieces (7,8) of different thicknesses in the case of a butt joint. On the other hand, according to FIG. 10, it can be present at a lap joint when workpieces (7,8) lie on top of one another.

During the adjustment, the height difference (h) can be the same as the height difference (w). Alternatively, it can approximate the height difference (w) and be slightly smaller. This is the case, for example, with the aforementioned sloped alignment of the welding tool (1) and its axis (5) with a penetration angle with respect to the workpieces (7,8). As a result, a better defined contact of the head piece (3) with only one end face region (14,15), in particular the lower end face region (15), on the upper or higher workpiece (8) can be achieved. In addition, it is possible to prevent a jam in the groove between the workpieces (7,8).

The head piece (22) can also have one or more openings (22) extending inward from the outer surface to the through-opening (4). These openings can, for example, be used to eject plasticized material drawn in from the through-opening (4).

The openings (22) can have a substantially circular mouth at the edge of the through-opening (4). The mouth can be larger on the outside of the head piece (3) or its body. The mouth can, for example, extend a little over the circumference of the body. This is advantageous for the rotating ejection. The alignment with the axis (5) can be sloped or in the manner of a screw section. The openings (22) can be present on both sides of the head piece (3) and can open opposite to one another at the through-opening (4).

In the exemplary embodiment shown, the head piece (3) is arranged on the welding tool (1) in a rotationally fixed manner. The head piece (3) can be arranged on the welding tool (1) in an exchangeable manner by means of a screw connection, bayonet lock or the like. The head piece (3) can be designed as an adapter for different work pieces (7,8) with a changing height difference (w) that are to be welded. The different head pieces (3) can have a plurality of height differences (h) at their end face regions (14, 15).

During the welding process, the welding tool (1) with the head piece (3) can be guided along the welding joint (9) in the feed direction (6). The step (16) between the end face regions (14,15) can serve as a leading edge. The step can be pressed against the end face of the thicker workpiece (8) for the butt joint or against the upper workpiece (8) for the lap joint. The leading contact can be detected by the handling device by means of a suitable force measurement and used to control or regulate the feed movement.

At the beginning of the welding process, the welding tool (1) can be fed to the workpieces (7,8) to be welded from its upper side with a vertical or sloped feed movement. By plasticizing the workpiece material, a starting hole can be formed, for example with the rotating welding pin (2), with the welding feed (6) subsequently taking place. During delivery, the head piece (3) can be aligned with the feed direction (6) and the weld joint (9) in a suitable manner. The head piece (3) can be coupled to the handling device in a rotationally fixed manner via the welding tool (1) and has a known rotation assignment.

In the drawings, the welding means (2) is indicated schematically. For an FSW welding tool, said means can be a rotating welding pin with a suitable tip, for example a conical tip, which plasticizes the workpiece. In other embodiments, the welding means (2) can be designed in a different way and cause the workpieces (7,8) to be plasticized at the welding point.

Modifications of the embodiments shown are possible in various ways. The number and arrangement of the end face regions (14,15) of different heights can vary, in particular if more than two workpieces (7,8) are to be welded.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Welding tool, FSW tool
2 Welding means, welding pin
3 Head piece, adapter
4 Through-opening
5 Axis
6 Welding feed direction
7 Workpiece
8 Workpiece
9 Weld joint, lap joint, butt joint
10 Gap
11 Weld seam
12 Welding transition region
13 End face
14 Higher end face region
15 Lower end face region
16 Step, leading edge
17 Sloped shoulder
18 Arcuate surface
19 Edge
20 Set-off
21 Cut-out
22 Opening
h Difference in height of the end face regions
w Difference in height of the workpieces

What is claimed is:

1. A head piece for a welding tool, the head piece comprising:
    a through-opening for receiving a plasticizing welding means;
    a profiled end face configured to face a workpiece during welding;
    the end face comprising end face regions having different heights along an axial direction of the head piece, the end face regions having different heights comprising a lower end face region and a higher end face region, the lower end face region and the higher end face region being generally flat, approximately parallel, and approximately normal to the axial direction of the head piece;
    a straight step formed between the lower end face region and the higher end face region, the straight step extending approximately centrally from a front edge of the through-opening in a welding feed direction; and
    a sloping shoulder connecting the lower end face region and the higher end face region and configured to conduct plasticized material of the workpiece during welding, wherein the sloping shoulder is arranged at a rear of the through-opening relative to the welding feed direction.

2. The head piece of claim 1, wherein at least one of:
    the welding tool is configured as a friction stir welding (FSW) tool; or
    the welding means is a rotatable welding pin.

3. The head piece of claim 1, wherein the sloping shoulder is arcuate and surrounds the through-opening in a semi-annular manner at the rear of the through-opening.

4. The head piece of claim 3, wherein the arcuate surface of the sloping shoulder has an elevation and slopes backward from a front edge of the arcuate surface facing the through-opening and in a direction toward the lower end face region.

5. The head piece of claim 1, wherein the end face regions of different heights extend from the through-opening in a welding feed direction.

6. The head piece of claim 5, wherein the end face regions have flat surfaces.

7. The head piece of claim 1, wherein the height difference of the end face regions is adapted to a height difference of work pieces to be welded on a weld joint.

8. The head piece of claim 7, wherein the height difference of the end face regions is adapted to a height difference of work pieces lying on top of one another and to be welded on a lap joint.

9. A welding tool, comprising:
a plasticizing welding means; and
a head piece, comprising:
    a through-opening for receiving the plasticizing welding means,
    a profiled end face configured to face a workpiece during welding,
    the end face comprising end face regions having different heights along an axial direction of the head piece, the end face regions having different heights comprising a lower end face region and a higher end face region, the lower end face region and the higher end face region being generally flat, approximately parallel, and approximately normal to the axial direction of the head piece,
    a straight step formed between the lower end face region and the higher end face region, the straight step extending approximately centrally from a front edge of the through-opening in a welding feed direction, and
    a sloping shoulder connecting the lower end face region and the higher end face region and configured to conduct plasticized material of the workpiece during welding, wherein the sloping shoulder is arranged at a rear of the through-opening relative to the welding feed direction.

10. The welding tool of claim 9, wherein the head piece is arranged in a rotationally fixed manner.

11. The welding tool of claim 9, wherein the head piece is arranged such that it can be exchanged and is configured as an adapter for different workpieces to be welded that have a height difference at the weld joint.

12. A welding method for welding workpieces, the method comprising:
providing the welding tool according to claim 9; and
welding with the welding tool along a welding path using a multi-axis industrial robot.

13. The welding method of claim 12, further comprising forming a weld joint at edge regions of the workpieces, which have a height difference.

14. The welding method of claim 13, wherein, during the welding, plasticized material is directed by the head piece of the welding tool such that a welding transition region is formed between the workpieces at the weld joint.

15. The method of claim 14, wherein the formed welding transition region is inclined.

16. The welding method of claim 12, further comprising closing a gap between the workpieces during the welding.

* * * * *